United States Patent
Stearman

(10) Patent No.: US 9,856,630 B2
(45) Date of Patent: Jan. 2, 2018

(54) MIXING SYSTEMS FOR WATER STORAGE TANKS

(71) Applicant: Tank Pro, Inc., Northport, AL (US)

(72) Inventor: Phillip Charles Stearman, Northport, AL (US)

(73) Assignee: Tank Pro, Inc., Northport, AL (US)

( * ) Notice: Subject to any disclaimer, the term of this patent is extended or adjusted under 35 U.S.C. 154(b) by 0 days.

(21) Appl. No.: 14/872,343

(22) Filed: Oct. 1, 2015

(65) Prior Publication Data

US 2017/0096800 A1 Apr. 6, 2017

(51) Int. Cl.
*E03B 1/02* (2006.01)

(52) U.S. Cl.
CPC ...................... *E03B 1/02* (2013.01)

(58) Field of Classification Search
CPC .......................................................... E03B 1/02
USPC .... 137/563, 565.01, 565.11, 565.16, 565.17, 137/590, 592; 134/198
See application file for complete search history.

(56) References Cited

U.S. PATENT DOCUMENTS

| | | | | |
|---|---|---|---|---|
| 3,428,061 A * | 2/1969 | Graham | ..................... | B01F 5/10 137/1 |
| 3,888,210 A * | 6/1975 | Buss | ....................... | A01K 61/00 119/226 |
| 4,510,922 A * | 4/1985 | Roussos | ................. | F24D 11/003 126/616 |
| 4,576,784 A * | 3/1986 | Kobayashi | ............ | F22B 37/228 137/592 |
| 5,137,694 A * | 8/1992 | Copeland | ............ | A47L 15/4436 134/56 D |
| 5,421,383 A * | 6/1995 | Schmid | .................. | B01F 3/0412 137/592 |
| 6,016,839 A | 1/2000 | Raftis et al. | | |
| 6,167,827 B1 * | 1/2001 | Keehan | ................... | B63B 11/04 114/74 A |
| 6,193,220 B1 | 2/2001 | Kelly | | |
| 6,372,140 B2 | 4/2002 | Kelly | | |
| 6,702,263 B2 | 3/2004 | Kelly | | |
| 6,767,008 B2 * | 7/2004 | Shane | ................... | B01F 3/0853 210/749 |
| 7,517,460 B2 | 4/2009 | Tormaschy et al. | | |

(Continued)

FOREIGN PATENT DOCUMENTS

| | | |
|---|---|---|
| CA | 2385902 A1 | 11/2002 |
| CA | 2366252 A1 | 6/2003 |
| GB | 2326603 A | 12/1998 |

*Primary Examiner* — Michael R Reid
*Assistant Examiner* — Paul J Gray
(74) *Attorney, Agent, or Firm* — Banner & Witcoff, Ltd.

(57) ABSTRACT

A system may include a water storage tank configured to at least temporarily store an amount of water in an enclosed interior section and a mixing system. The mixing system may include an intake conduit having at least a portion positioned in the interior section to withdraw water from the lower portion of the water storage tank. A pump system may have an intake section and a discharge section, the intake section being coupled to the intake conduit. A discharge conduit may be coupled to the discharge section of the pump system. A discharge fixture may be positioned in the interior section and may include a plurality of discharge holes configured to spray water from the discharge conduit into the water storage tank so as to mix at least a portion of water inside the water storage tank.

15 Claims, 12 Drawing Sheets

(56) References Cited

U.S. PATENT DOCUMENTS

| | | | |
|---|---|---|---|
| 7,641,792 B2 | 1/2010 | Tormaschy et al. | |
| 7,906,017 B2 | 3/2011 | Tormaschy et al. | |
| 8,388,837 B2 | 3/2013 | Tormaschy et al. | |
| 8,500,321 B2 | 8/2013 | Simnioniw et al. | |
| 8,523,425 B2 | 9/2013 | Malmquist | |
| 8,911,219 B2 | 12/2014 | Walter et al. | |
| 2004/0084357 A1* | 5/2004 | Nagler | B01D 1/28 210/85 |
| 2010/0147393 A1* | 6/2010 | Schroeder | F22B 37/54 137/11 |
| 2012/0067799 A1 | 3/2012 | Simnioniw et al. | |
| 2012/0241579 A1* | 9/2012 | Karlsson | F21V 21/096 248/343 |
| 2012/0291827 A1* | 11/2012 | Buddharaju | A47L 15/42 134/198 |

* cited by examiner

MIXING SYSTEMS FOR WATER STORAGE TANKS

BACKGROUND

Many water supply systems include a water storage tank, such as an elevated water tower or an on-ground water tank. A water storage tank may operate in conjunction with underground or surface service reservoirs and may store treated water close to where the water will be used. Many water storage tanks provide distribution of potable water as well as emergency storage for fire protection or for during power outages. Water storage tanks also often serve as a reservoir to help meet water needs during peak usage times. In particular, the water level in the tank may fall during certain peak usage hours of the day, and the tank may subsequently be refilled during non-peak usage hours. Accordingly, a water supply in the tank may constantly be, at least partially, drained and refilled.

Water storage tanks are often quite large and may hold on the order of 100,000 gallons and up to 2 million gallons or more. Often, a small amount of sediment or particulate in the treated water will collect at the bottom of the tank. Over time, this may accumulate to a large amount. This accumulation is a potentially serious issue, especially for potable water. It may be desirable to mix water at the bottom of the tank with water at the top of the tank so as to reduce settlement and thereby prevent sludge accumulation in the bottom of the tank. Known water mixing systems may use moving agitators or may passively circulate water using energy created during the fill and draw cycles. These systems are of limited effectiveness and/or have other disadvantages. Additionally, all or most components of known systems are provided in an interior section of the tank, making maintenance and repair more costly and time-consuming.

SUMMARY

This Summary is provided to introduce a selection of concepts in a simplified form that is further described below in the Detailed Description. This Summary is not intended to identify key features or essential features of the invention.

In some embodiments, a system may include a water storage tank configured to at least temporarily store an amount of water in an enclosed interior section and a mixing system. The mixing system may include an intake conduit having at least a portion positioned in the interior section to withdraw water from a lower portion of the water storage tank. A pump system may have an intake section and a discharge section, with the intake section being coupled to the intake conduit. A discharge conduit may be coupled to the discharge section of the pump system. A discharge fixture may be positioned in the interior section and may include a plurality of discharge holes configured to spray water from the discharge conduit into the water storage tank so as to mix at least a portion of water inside the water storage tank. In some embodiments, one or more magnetically-affixable support brackets may be used to secure at least a portion of the discharge conduit to an interior wall of the water storage tank.

Embodiments also include methods for installing a mixing system for a water tank. Steps of the method may include installing a pump system on an exterior portion of the water tank and forming a hole comprising an intake port and a hole comprising a discharge port in a side wall of the water tank. An intake conduit may be connected to an intake section of the pump system, the intake conduit including or passing through the intake port. A discharge conduit may be connected to a discharge section of the pump system, the discharge conduit including or passing through the discharge port. A discharge fixture may be coupled to the discharge conduit in an interior portion of the water tank above the intake conduit. The discharge conduit may have a plurality of discharge holes such that, when the water tank is at least partially filled with water and when the pump system is operating, the plurality of discharge holes eject water into the water tank so as to mix at least a portion of the water in the water tank. Additional embodiments are described herein.

BRIEF DESCRIPTION OF THE DRAWINGS

The above and other features, aspects, and advantages of the invention will be fully apparent and understood from the following detailed description, taken together with the appended drawings, wherein.

The reader is advised that the various parts shown in these drawings are not necessarily drawn to scale.

DETAILED DESCRIPTION OF EXAMPLE EMBODIMENTS

Mixing systems for water storage tanks according to various embodiments described herein may be used to redistribute water in the water storage tank. In at least some embodiments, a mixing system may be connected to a pre-existing structure in an interior portion of the water storage tank, such as interior side walls and/or a pre-existing ladder structure. The mixing system may include other components to structurally secure portions of the mixing system in an interior section of the water storage tank. In various embodiments, a mixing system may be configured to redistribute water vertically, horizontally, or combinations thereof, throughout at least a portion of the water storage tank.

Mixing systems described herein may be employed in potable water towers, leg tank water towers, and the like. In some aspects, the mixing systems may be installed in virtually any new or existing water tank, with slight modifications to account for varying sizes and shapes of water tanks.

In the following figures, portions of the water storage tank and the mixing system may not necessarily be shown to scale. In particular, elements of the mixing system may be shown exaggerated in size relative to the water storage tank for purposes of explanation.

Figure 1A:
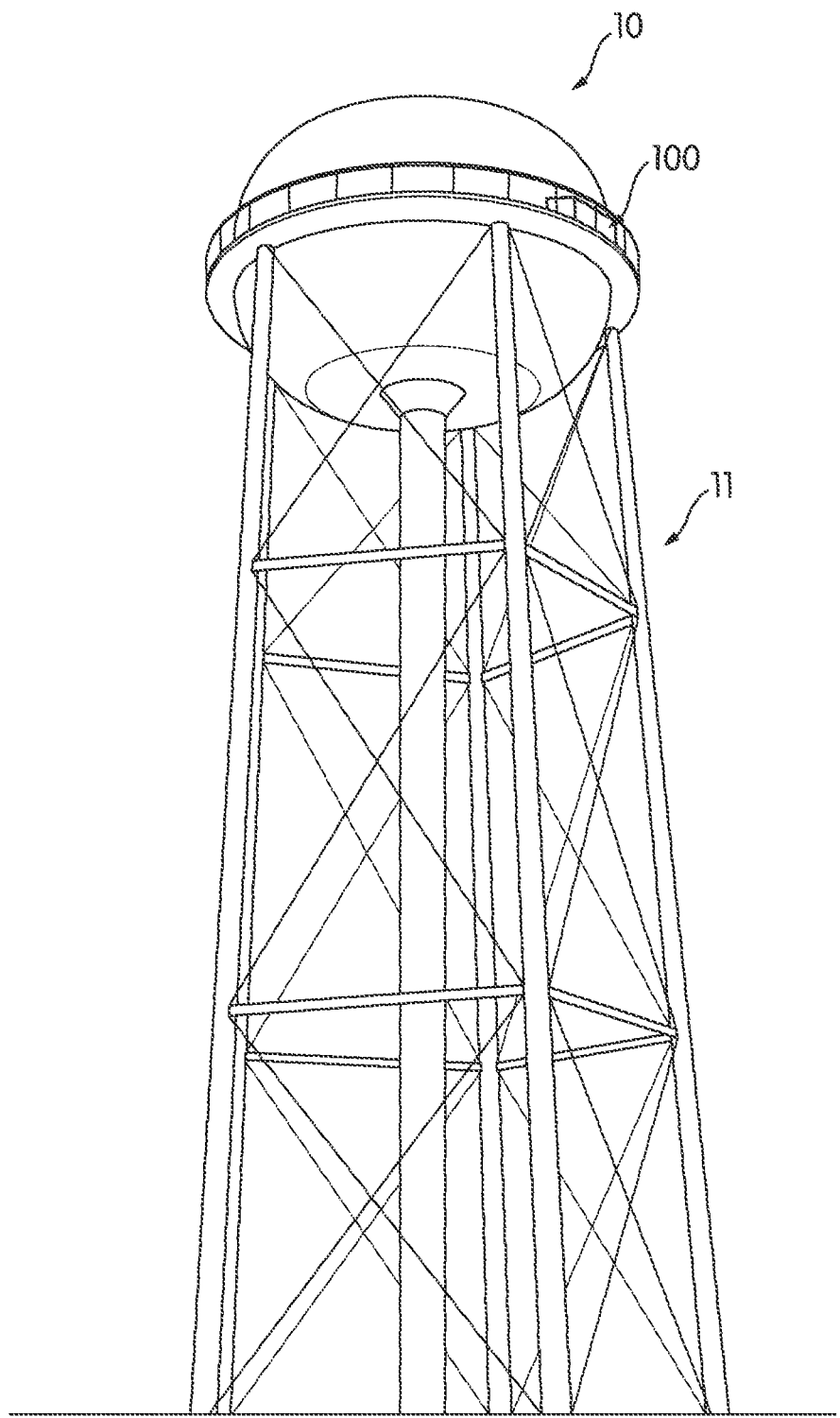
FIGS. 1A and 1B illustrate examples of a mixing system with a water storage tank, according to some embodiments.
Figure 1B:
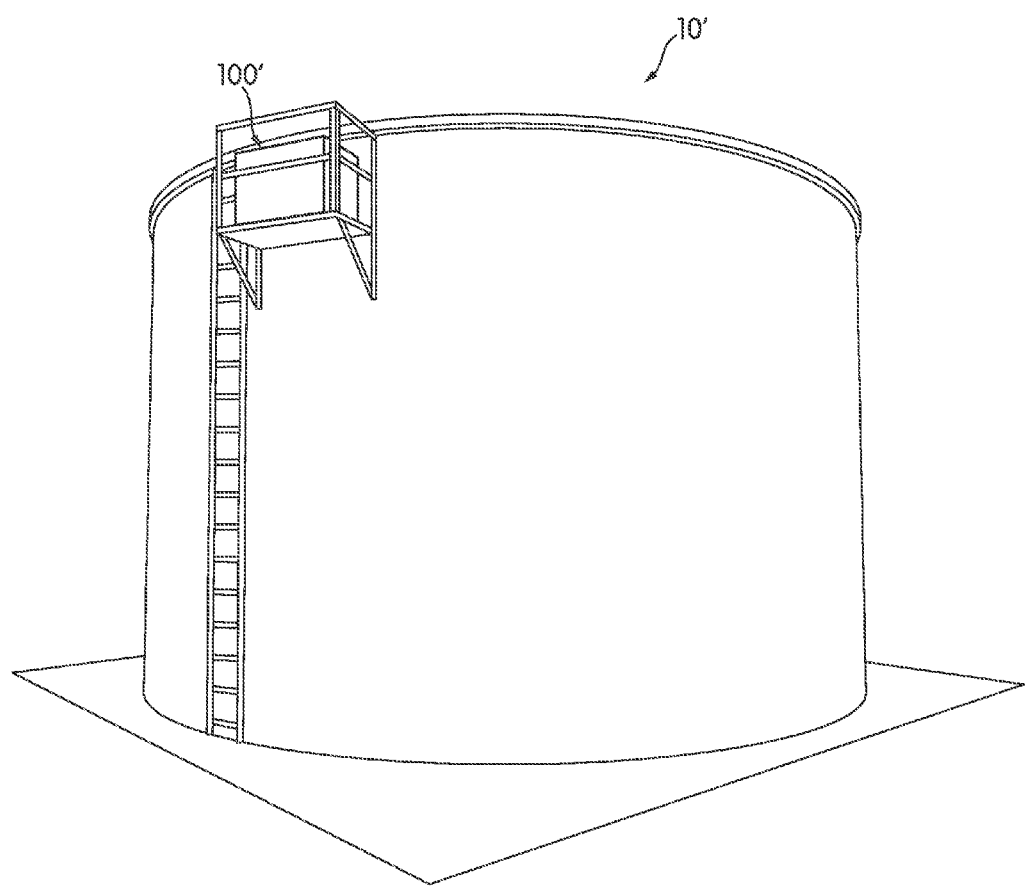

In one example, FIG. 1A depicts an elevated water storage tank 10 and mixing system 100. In FIG. 1A, the water storage tank 10 is disposed at a height above ground by a tower structure 11. In another example, FIG. 1B depicts an on-ground water storage tank 10' and mixing system 100'. FIG. 1A depicts a water tank 10 having a generally cylindrical midsection and rounded upper and lower portions. FIG. 1B depicts a water tank 10' of a substantially cylindrical shape throughout. In other embodiments, mixing systems may be employed in water storage tank of other varying shapes and geometries, as well as various other types of water storage tanks without departing from the scope of the present disclosure.

FIGS. 1A and 1B schematically depict portions of mixing systems 100 and 100' positioned on an exterior portion of a water storage tank. Portions of mixing systems located on an exterior of the water storage tank may include a cover for environmental protection of the various components positioned on the exterior portion, as will be discussed in more detail below.

Figure 2:
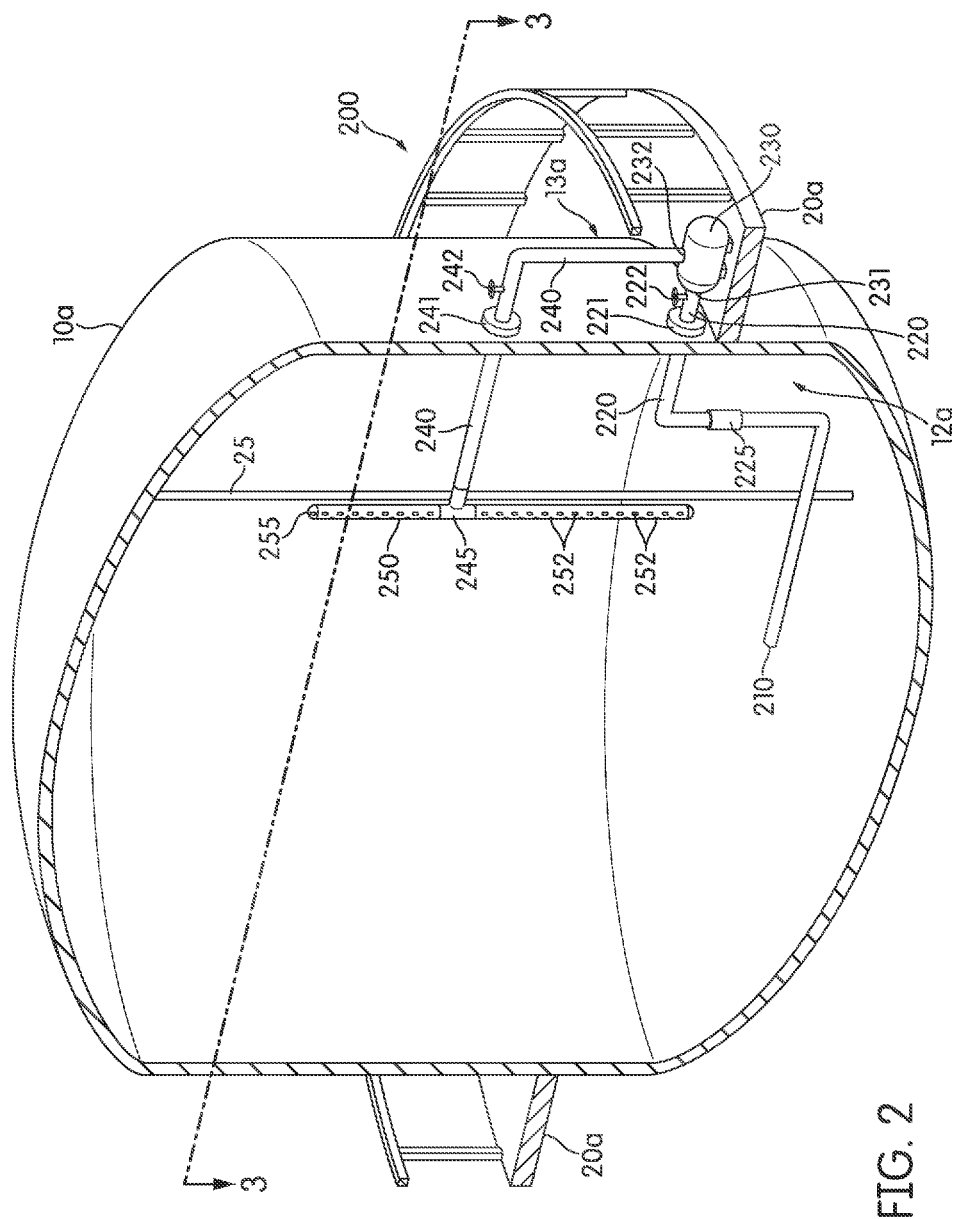
FIG. 2 is a cutaway perspective view of a vertical mixing system, according to some embodiments.
Figure 3:
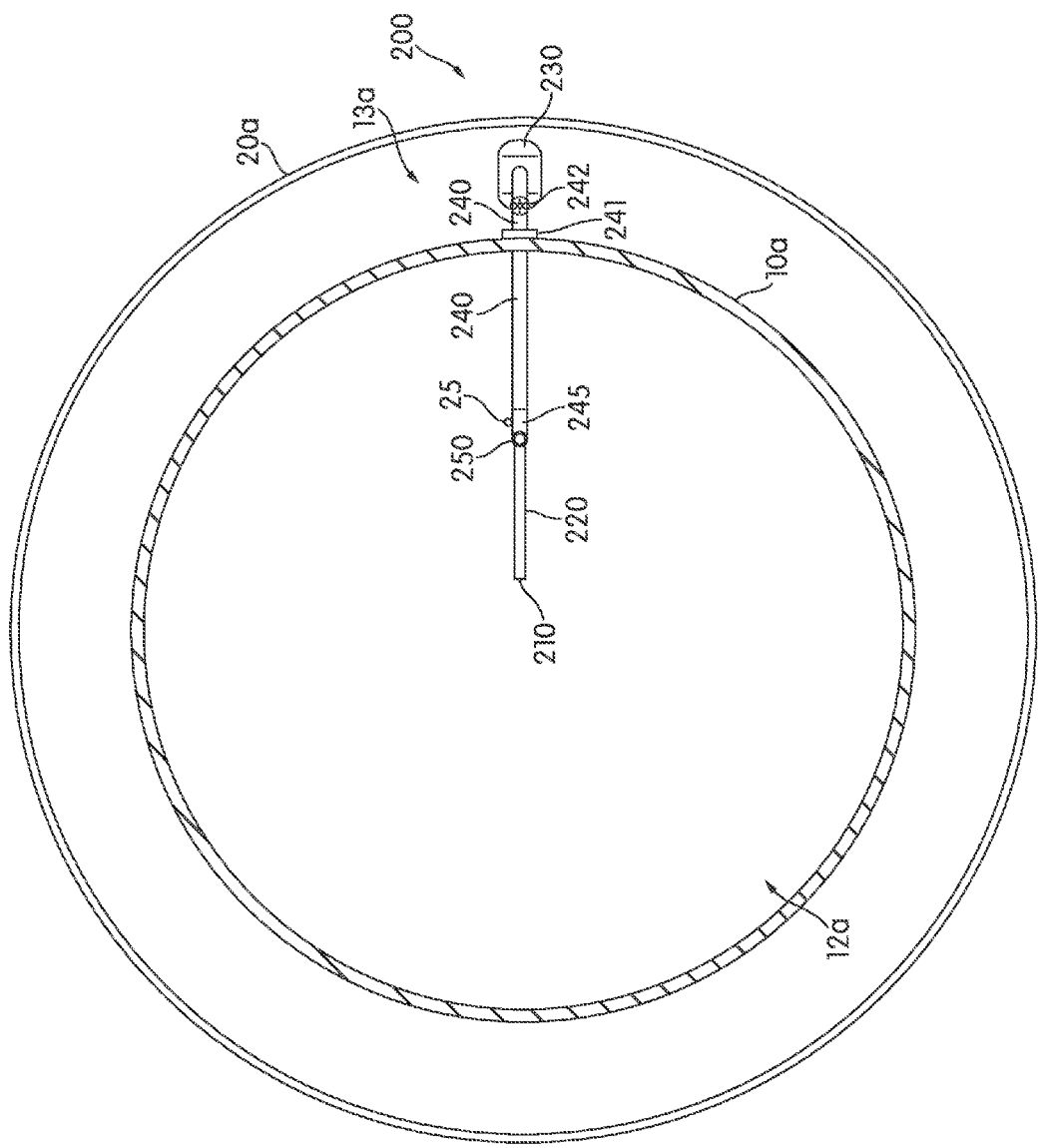
FIG. 3 is a cross-sectional view of the vertical mixing system shown in FIG. 2, according to some embodiments.
Figure 4:
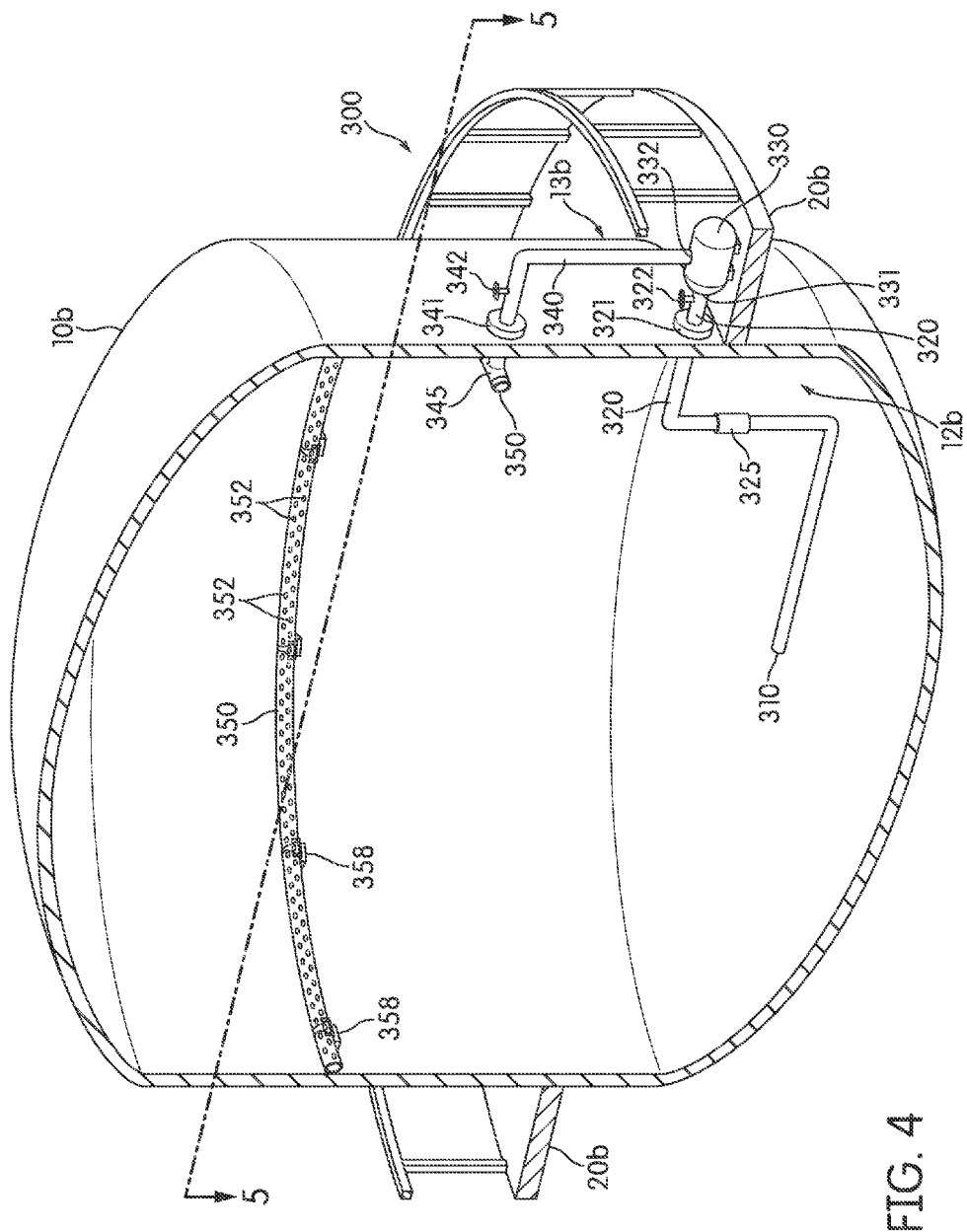
FIG. 4 is a cutaway perspective view of a horizontal mixing system, according to some embodiments.
Figure 5:
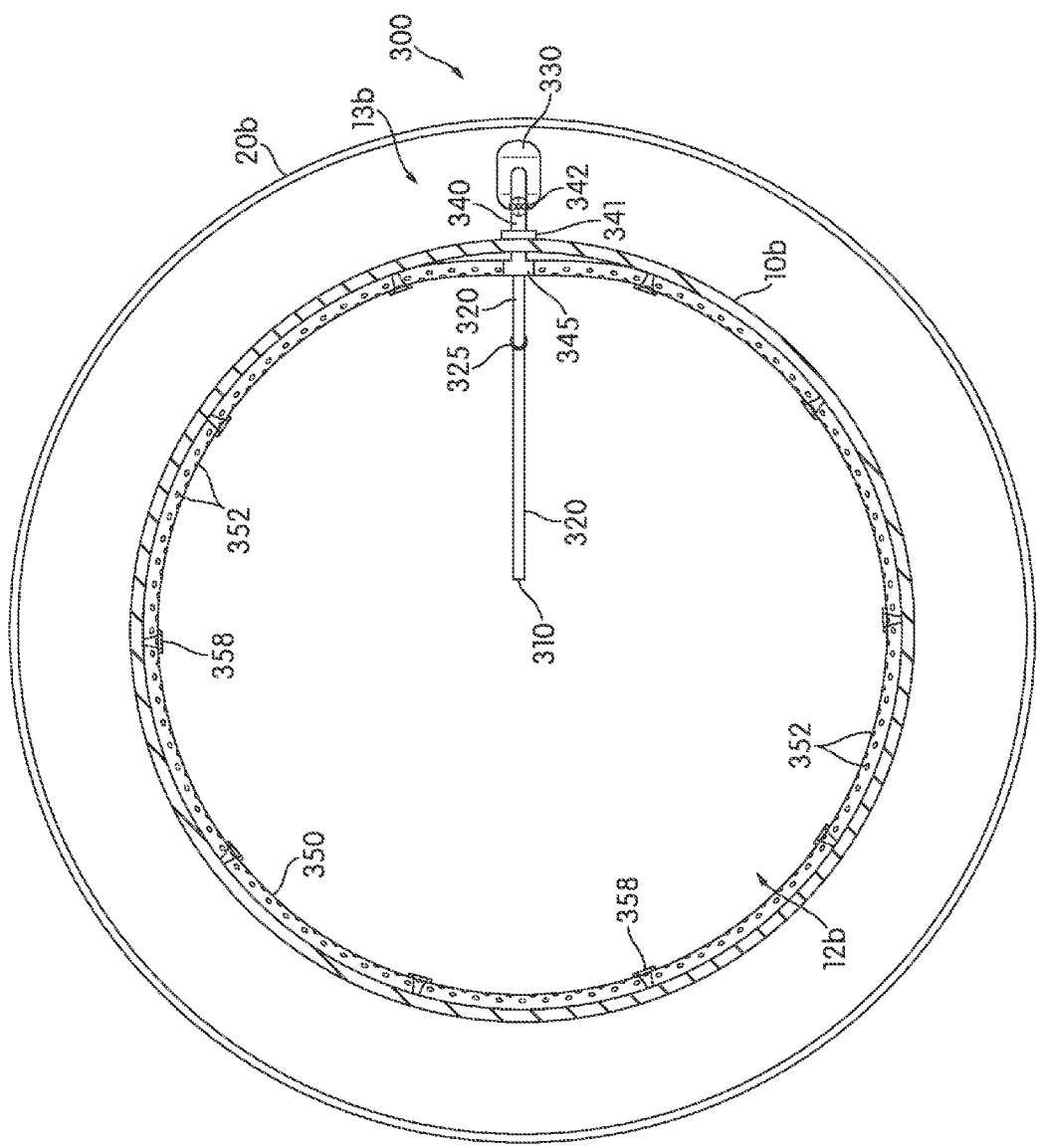
FIG. 5 is a cross-sectional view of the horizontal mixing system shown in FIG. 4, according to some embodiments.
Figure 6:
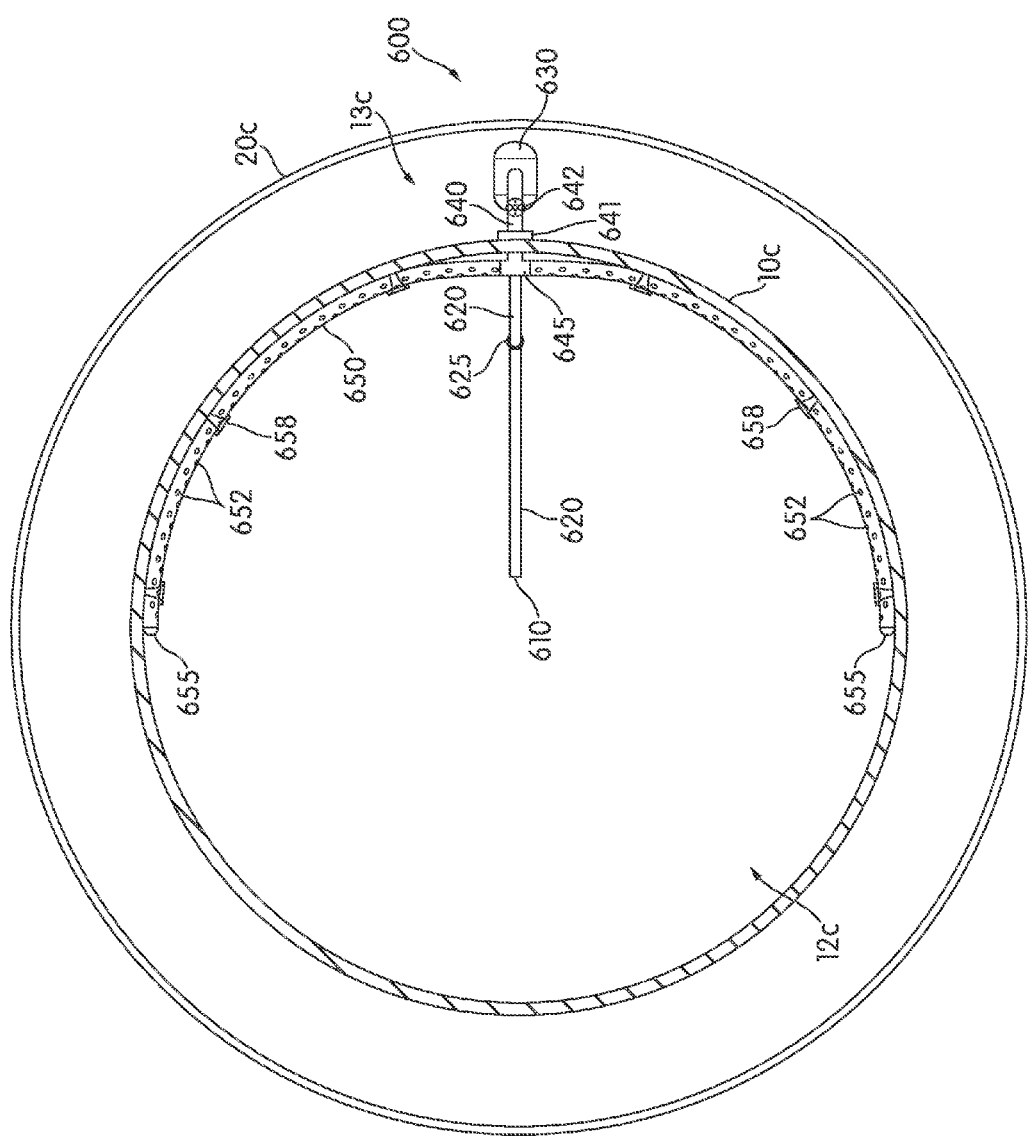
FIG. 6 is a cross-sectional view of a horizontal mixing system, according to some embodiments, taken from a location similar to that indicated in FIG. 4.
Figure 7:
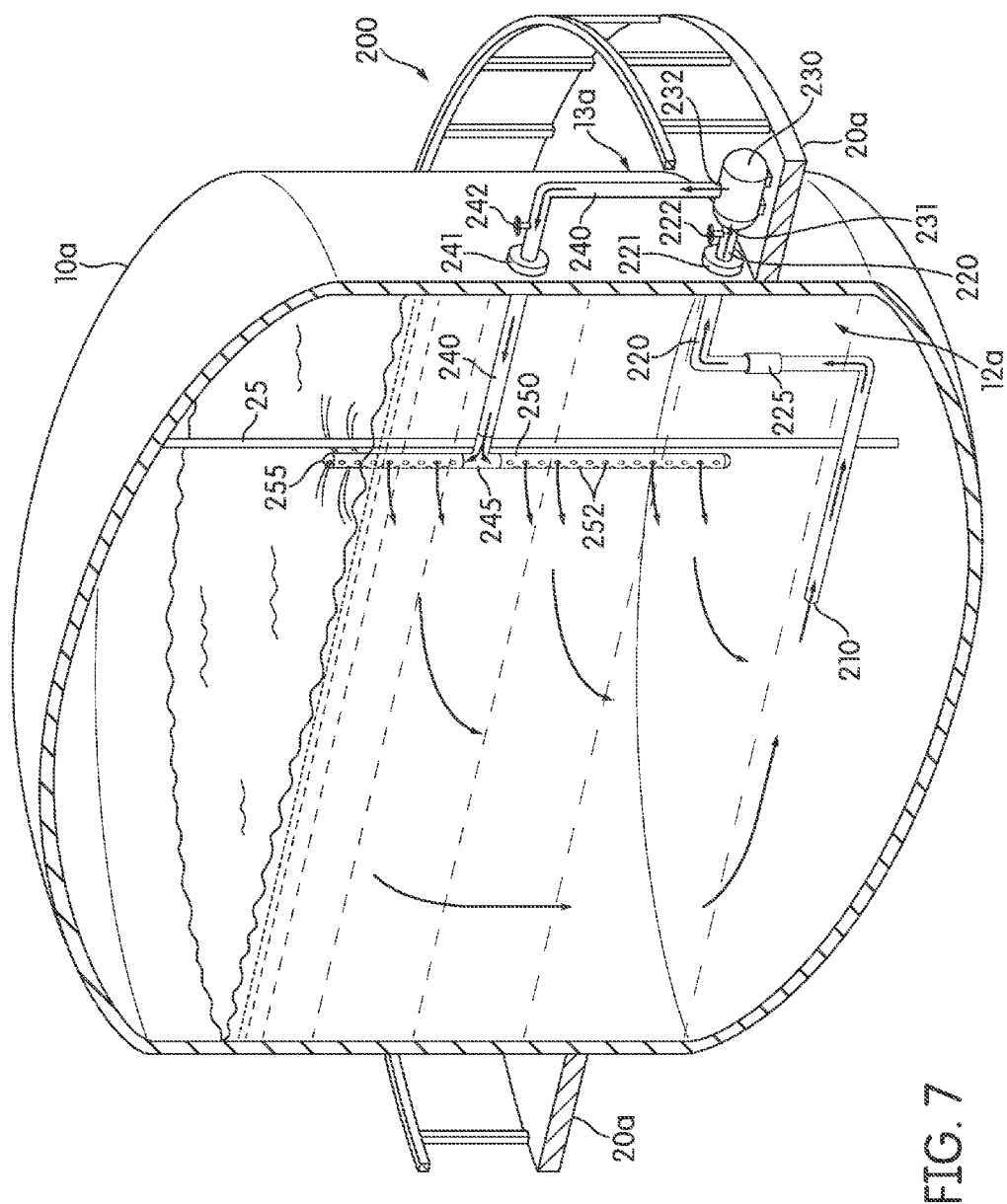
FIG. 7 is a cutaway perspective view of the vertical mixing system shown in FIG. 2, showing water flow through the vertical mixing system.
Figure 8:
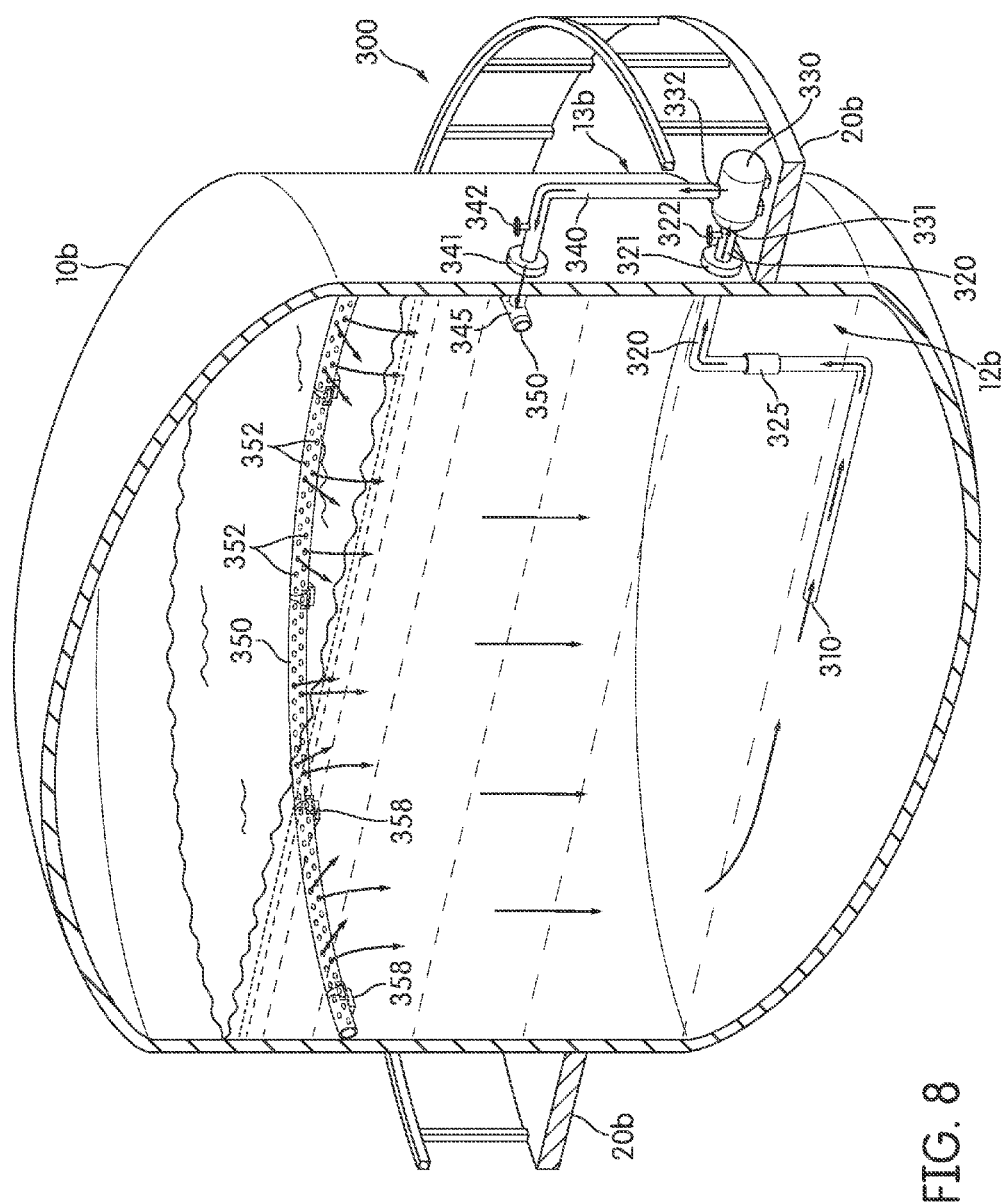
FIG. 8 is a cutaway perspective view of the horizontal mixing system shown in FIG. 4, showing water flow through the horizontal mixing system

Mixing systems 100 and 100' of FIGS. 1A and 1B may be a mixing system 200 as shown in FIGS. 2, 3, and 7, or a mixing system 300 as shown in FIGS. 4, 5, and 8 or a mixing system 600 as shown in FIG. 6.

Additional features of the mixing system may be disposed in an interior section of a water storage tank. FIG. 2 illustrates a cutaway perspective view of a mixing system 200 installed in an elevated water tank 10a that is similar to tank 10 of FIG. 1A. Mixing system 200 includes components in an interior section 12a of tank 10a as well as components in an exterior section 13a of tank 10a. In other embodiments, the mixing system 200 may be positioned entirely within the interior section 12a. In FIG. 2, portions of the side wall, top wall, and bottom wall of the water storage tank 10a have been omitted for purposes of explanation.

FIG. 2 illustrates a mixing system 200 that may redistribute water along at least a portion of a vertical length of the water storage tank 10a. For convenience, a system having a configuration such as that shown in FIG. 2 is referred to herein as a vertical mixing system. The water storage tank 10a may be configured to at least temporarily store an amount of water in an enclosed interior section 12a. Further, a drain portion may be included on a lower surface of the water storage tank by which water is transported into and out of the water storage tank. To avoid burdening the drawings with unneeded detail, the drain portion has been omitted from FIG. 2 and from other drawing figures.

The water storage tank 10a, as shown in FIG. 2, includes a catwalk 20a that extends around a periphery of the exterior section 13a of the water storage tank 10a. Exterior portions of the mixing system may rest on or be affixed to the catwalk 20a. As shown in FIG. 2, the catwalk 20a may include a flat bottom surface and a railing, both extending around the periphery of the exterior section 13a.

An intake opening 210 may be positioned in a lower portion of the interior section 12a. The intake opening 210 may be located at an end of an intake conduit 220. Intake conduit 220, as well as discharge conduit 240 (described below) may comprise appropriately sized PVC piping. As shown in FIG. 2, the intake conduit 220 has a portion positioned in the interior section 12a to withdraw water from the lower portion of the water storage tank via the intake opening 210. The intake conduit 220 may extend from an intake section 231 of a pump system 230 positioned on the exterior section 13a of the water storage tank 10a, and extend into the interior section 12a. Intake conduit 220 may include check valve 225 to ensure proper water flow through the intake conduit 220.

Figure 9:
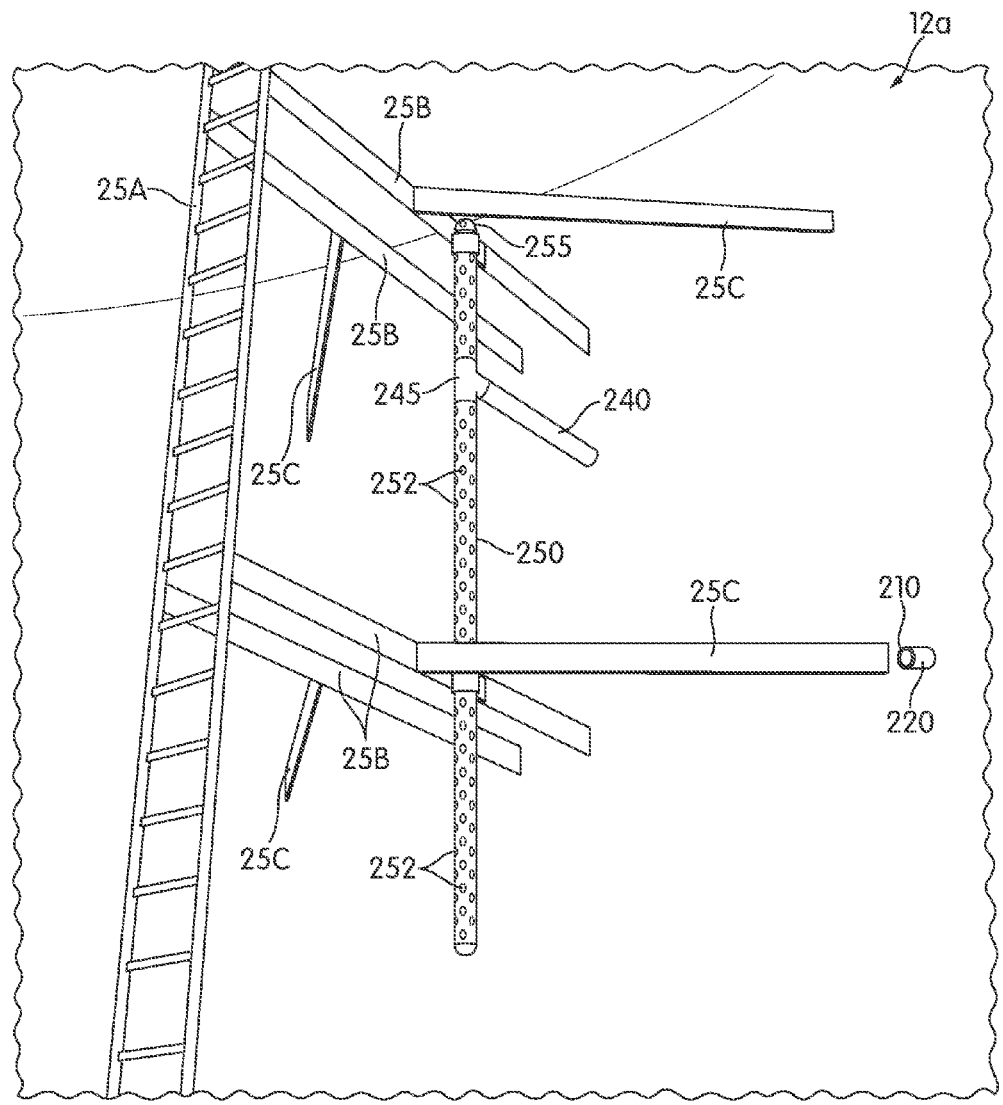
FIG. 9 is a close-up perspective view of a portion of a vertical mixing system, according to some embodiments.

The intake conduit 220 may extend into the water storage tank 10a, in both the horizontal and vertical direction. As shown in FIG. 2, the intake conduit 220 includes two elbow joints such that the intake conduit 220 extends below the intake section 231 and further inwards into the interior section 12a. In other examples, the intake conduit 220 may include only a straight conduit such that the intake opening 210 is disposed at a same vertical location as the intake section 231. For example, FIG. 9 shows an intake opening 210 positioned at a same height at which the intake conduit 220 penetrates the tank wall. In some embodiments, the intake conduit 220 may be a relative short length in order to reduce vibration of the intake conduit 220 during operation of the mixing system 200 (e.g., when a pump is operating to circulate water), and/or to limit stress on intake conduit 220 when a large volume of water is rapidly drained from interior section 12a. In other examples, the intake conduit 220 may include any other number of bends or turns and may extend to any depth into the interior section 12a, without departing from the scope of the present disclosure. Preferably the intake opening 210 is positioned in a lower portion of the water storage tank 10a and below the discharge conduit 240 and the discharge fixture 250. Additionally, intake opening 210 may be positioned at least below an average water level or a minimum water level of the water storage tank 10a such that the intake opening 210 always has a supply of water to feed to the intake conduit 220 via a self-priming pump system 230.

As shown in FIG. 2, a pump system 230, e.g., including a pump motor, is positioned on the catwalk 20a located along an exterior section 13a of the water storage tank 10a. While the pump system 230 is shown on the catwalk 20a of the water storage tank 10a in FIG. 2, the pump system 230 may be positioned in other location relative to the water storage tank 10a. In some examples, the pump system 230 may be positioned on another exterior feature of the water storage tank 10a or on another structure in the vicinity of the water storage tank 10a. In some examples, the pump system may be positioned on the ground, below or near the water storage tank 10a. Accordingly, the mixing system may include a longer intake conduit 220 and a longer discharge conduit 240 than shown in FIG. 2 in order to couple with the pump system 230 on the ground. Additionally, the pump system 230 may include a higher strength pump to circulate the water through the longer conduits.

The pump system 230 may include an intake section 231 and a discharge section 232. The intake section 231 may be coupled to the intake conduit 220, for example via a PVC coupling. Materials to provide electrical power to the pump motor may additionally be included in the pump system 230. The pump system 230 may include a pump motor, e.g., a single speed, single phase 208-230 volt pump motor, such as the Jandy® SHPF5.0 pump motor. A wire size for installing a power supply to the pump system 230 may vary depending on the distance of the pump system 230 from the power source. A power source may be brought close to, e.g., within 5 feet of, the pump system 230 and the pump motor may include its own breaker panel on the catwalk 20a for easier maintenance of the mixing system 200.

A discharge conduit 240 may be coupled to the discharge section 232 of the pump system 230. The discharge conduit 240 may include a conduit of larger diameter than the intake conduit 220. In other examples, the discharge conduit 240 and intake conduit 220 may include conduits of the same size, or the intake conduit 220 may be of a larger diameter than the discharge conduit 240.

As shown in FIG. 2, a portion of the intake conduit 220 and a portion of the discharge conduit 240 extend outside the water storage tank 10a via respective ports 221 and 241 located on the water storage tank 10a. In particular, holes may be drilled or otherwise formed in walls of the water storage tank 10a to install ports 221 and 241. Intake conduit 220 may be coupled to the intake section 231 of pump system, and pass through the intake port 221 into the interior section 12a of the water storage tank 10a. Similarly, the discharge conduit 240 may be coupled to the discharge section 232 of pump system, and pass through the discharge port 241 into the interior section 12a of the water storage tank 10a.

In some embodiments, carbon steel, double sided flanged fittings are then welded into place around the holes formed in the wall of the water storage tank 10a, on both the interior and exterior sides. However, other fittings may also be used without departing from the scope of the present disclosure. The fittings may also be blasted, primed, epoxy painted, and tested (e.g., holiday tested to detect any discontinuities in coating) to ensure appropriate operation. In particular, the ports should be installed leak free for proper operation of the mixing system when the water storage tank is filled.

In some embodiments, and as generally indicated above, intake conduit 220 and discharge conduit 240 may comprise sections of pipe that pass through ports 221 and 241, respectively, with seals placed between the outer walls of those pipe sections and inner bores of ports 221 and 241. In some embodiments, fittings on ports 221 and 241 may form portions of intake conduit 220 and discharge conduit 240. For example, a section of pipe forming part of intake conduit 220 in interior section 12a may be coupled to an interior side of the fitting on port 221, and a separate section of pipe forming part of intake conduit 220 in exterior section 13a may be coupled to an exterior side of the fitting on port 221. Similarly, a section of pipe forming part of discharge conduit 240 in interior section 12a may be coupled to an interior side of the fitting on port 241, and a separate section of pipe forming part of discharge conduit 240 in exterior section 13a may be coupled to an exterior side of the fitting of port 241. In some embodiments, flanges or other separate fittings may be omitted.

Ports 221 and 241 may be installed at a location corresponding to an appropriate portion in the interior section 12a of the water storage tank 10a. For example, ports 221 and 241 may be installed in a portion of the water storage tank 10a closer to a structure 25, to which portions of the mixing system 200 will be attached. Selection of locations for ports 221 and 241 may also be based, at least in part, on conditions on the exterior section 13a of the water storage tank 10a. For example, it may be necessary to place the pump system 230 in a certain location for access to power. To minimize piping, ports 221 and 241 may be located as close as possible to the intake section 231 and discharge section 232, respectively, of the pump system 230.

The double sided flanged fitting for port 241, connecting the discharge conduit 240 to the pump system 230 may, in some examples, be no higher than 4 feet above the elevation of the catwalk 20a where the pump motor of the pump system 230 will be mounted, e.g., to reduce the amount of a vertical portion of the discharge conduit 240. The double sided flanged fitting for port 221, connecting the intake conduit 220 to the pump system 230 may be placed no higher than an elevation of intake section 231, such that the intake conduit 220 may be plumbed directly into intake section 231 without additional fittings. Further the pump system 230, including a circulation pump and motor, may be placed on a same general circumferential location of the exterior section 13a as ports 221 and 241.

An intake valve 222, such as a gate valve or isolation valve, may be included in a portion of the intake conduit 220 on an exterior section 13a of the water storage tank 10a. For example, a butterfly valve with a PVC flange may be used with a double sided flanged fitting used with port 221 and with the intake conduit 220. A discharge valve 242 may similarly be included in a portion of the discharge conduit 240 on an exterior section 13a of the water storage tank 10a. Including valves on both the intake and discharge side may allow for certain service and/or maintenance of the mixing system without requiring the water storage tank to be drained. In some examples, two or more intake valves 222 and two or more discharge valves 242 may be provided.

A discharge fixture 250 may be positioned in the interior section 12a and coupled to the discharge conduit 240 via a tee 245. As shown in FIG. 2, the discharge fixture 250 may vertically extend along at least a portion of an interior height of the water storage tank 10a.

The discharge fixture 250 may be placed such that it will be located completely below the water level during typical operating conditions of the water storage tank 10a. In some examples, an upper portion of the discharge fixture 250 may be positioned above a typical water level to provide aeration in the water storage tank 10a. For example, the discharge fixture 250 may include one or more segments of PVC pipe (or tubing or pipe formed from another material) extending on either side of the tee 245. In other embodiments, the discharge fixture 250 may extend in one direction, e.g., upwards or downwards, from the discharge conduit. Further, the discharge fixture 250 may include a single conduit or pipe segment or multiple conduits or pipe segments that are coupled together. The discharge fixture 250 may be structurally attached to a structure 25 in the interior section 12a, e.g., with steel clamps. Structure 25 may be a pre-existing structure within the water storage tank 10a. Examples include a ladder, ladder support beams, and the like. In some embodiments, a discharge fixture 250 may be attached to a wall or a preexisting structure in the water storage tank 10a using one or more magnetically-affixable support brackets, as will be described in more detail below.

In some examples and as shown in FIG. 9, the discharge fixture 250 may be attached to an existing ladder structure. In particular, a ladder 25A may extend along at least a portion of a vertical length of interior section 12a of water storage tank 10a and may extend outward into the interior section 12a. Ladder 25A may be attached to and supported by beams 25B and 25C. The discharge fixture 250 may be attached to the ladder structure but still allow for the ladder 25A to be utilized when necessary by attaching the discharge fixture 250 between beams 25B and support beams 25C, as shown in FIG. 9.

Referring back to FIG. 2, the discharge fixture 250 includes a plurality of discharge holes 252 configured to spray water from the discharge conduit 240 into the water storage tank 10a so as to mix at least a portion of water inside the water storage tank. The plurality of discharge holes 252 may be positioned on pipe segments along the discharge fixture 250 to eject water throughout at least a portion of the water storage tank. For example, for a 4-inch PVC pipe, the discharge holes may be approximately 0.5 inches, with at least 3 inches provided between discharge holes in order to avoid weakening or breaking the discharge fixture 250. The number of discharge holes provided in each segment of the discharge fixture 250 may vary depending on the length of the discharge fixture 250 and how much the discharge fixture 250 extends above and below tee 245. A desired flow of the mixing system may be accomplished by adjusting the amount and/or size of discharge holes 252 provided in the discharge fixture 250. The plurality of discharge holes 252 may extend throughout the discharge fixture, e.g., both above and below the tee 245. As shown in the example in FIG. 2, tee 245 does not include discharge holes.

The plurality of discharge holes 252 may be positioned on the discharge fixture 250 such that, in operation, water may be ejected from the holes and be directed away from the discharge fixture 250. In some embodiments, if the discharge fixture 250 is positioned on or near a portion of a wall, the plurality of discharge holes 252 may be configured to eject water towards a portion of an opposite wall. In some embodiments, the discharge holes 252 may be configured to eject water straight out horizontally, or out horizontally and upwards vertically to eject water away from the discharge fixture 250 and/or towards an opposite wall of the water tank. After water is sprayed from the discharge fixture 250, it may then flow around at least a portion of the outer perimeter of the water storage tank due to the curvature of the tank, and thereby creating an effective water circulation.

FIG. 3 is cross-sectional view of the mixing system 200 taken along the sectioning plane indicated in FIG. 2. As shown in FIG. 3, which also shows a portion of the water storage tank 10a cut away in FIG. 2, the pump system 230 is positioned on catwalk 20a. Also shown in FIG. 3 are discharge conduit 240 attached to structure 25 and intake opening 210 on intake conduit 220 which extends inward into the interior section 12a.

As shown in FIG. 2, a top end cap 255 and a bottom end cap 256 may be coupled to end portions of the discharge fixture 250. The top end cap 255 may include a plurality of discharge holes for spraying water upwards in the water storage tank 10a. Discharge holes in the top end cap 255 may relieve some amount of pressure in the discharge fixture 250 and allow water to be sprayed upwards above the water level thus aerating the contents of the water storage tank 10a across a top surface of the water level. As shown in FIG. 2, the bottom end cap 256 does not include discharge holes, so as not to create turbidity by stirring sediment accumulated on a bottom surface of the water storage tank 10a.

FIG. 7 illustrates a circulation of water when the mixing system 200 is operating. Water enters intake opening 210 and passes through intake conduit 220 to pump system 230. Water then flows from pump system 230 and through discharge conduit 240 into discharge fixture 250, from which the water is ejected outward from discharge holes 252. In the configuration shown, water is ejected toward a portion of the interior wall of the water storage tank 10a that is opposite the portion nearest discharge fixture 250. Eventually, some of the circulated water may move downwards in the tank to eventually circulate into the intake opening 210 and through the mixing system once more. Because the discharge holes 252 are configured to eject water horizontally towards an opposite wall, an effective circulation of water is occurs in the water storage tank.

FIG. 4 illustrates a cutaway perspective view of a mixing system 300 according to some embodiments. Mixing system 300 is installed on a water storage tank 10b that is similar to water storage tank 10a. In particular, FIG. 4 illustrates a mixing system 300 that redistributes water through a discharge fixture 350 that is positioned horizontally along at least a portion of a periphery of an interior section 12b of tank 10b. For convenience, the configuration of mixing system 300 is referred to herein as a horizontal mixing system.

Many aspects of the mixing system 300 shown in FIG. 4 are similar to the mixing system 200 shown in FIG. 2. For example, intake opening 310, check valve 325, intake conduit 320, intake port 321, valve 322, pump system 330, discharge conduit 340, valve 342 and discharge port 341 are substantially similar to intake opening 210, check valve 225, intake conduit 220, intake port 221, valve 222, pump system 230, discharge conduit 240, valve 242 and discharge port 241, respectively shown in the embodiment illustrated in FIG. 2. Discharge fixture 350 is, in some respects, similar to discharge fixture 250 of FIG. 2. For example, discharge fixture 350 is vertically above intake conduit 320 and is coupled to discharge conduit 340 via tee 345. Discharge fixture 350 may include a plurality of discharge holes 352, with similar sizing and spacing as described regarding discharge fixture 250 of the vertical mixing system in FIG. 2. However, unlike discharge fixture 250 of FIG. 2, discharge fixture 350 as illustrated in FIG. 4 includes pipe segments extending horizontally along at least a portion of a periphery of a side wall of the water storage tank 10b at a vertical location above the water intake opening 310. In some examples, discharge fixture 350 may include one or more segments of flexible PVC pipe.

In some embodiments, the discharge fixture 350 may be at a same level as the discharge port 341. In some such embodiments, discharge port 341 may be no higher than 4 feet above a walking surface of catwalk 20b and the intake conduit 320 may be placed no lower than 8 inches above the walking surface of the catwalk 20b and no higher than the intake section 331.

The plurality of discharge holes 352 may be configured to eject water horizontally away from the walls of the water storage tank 10b and toward a central region of the interior section 12b. In some examples, at least some of the plurality of discharge holes 352 may be configured to eject water at a 45 degree angle or more upward, in order to direct water upward.

Magnetically-affixable support brackets 358 may be affixed to portions of an interior side wall of the water storage tank 10b, e.g., at least every 10 feet at a same vertical height along the wall. Portions of the discharge fixture 350 may be affixed to the magnetically-affixable support brackets 358 so as to attach the discharge fixture 350 along an interior wall of the water storage tank 10b. The magnetically-affixable support brackets 358 may be composed of carbon steel, epoxy coated ell brackets.

The magnetically-affixable support brackets 358 may be advantageous for various reasons in the mixing system 300. For example, use of magnetically-affixable support brackets 358 avoids needing to weld or otherwise permanently attach components to an interior surface of the tank. This may desirable because the interior surface may have a coating that would be damaged if welding were performed and/or because improper welding may result in deformities in the tank, e.g., cracks or leaks. Additionally, magnetically-affixable support brackets 358 may be affixed to any portion of the interior section 12b of tank 10b and are not dependent on locations of pre-existing structures in the tank. Magnetically-affixable support brackets 358 are also more easily adjusted during the installation process to properly mount the discharge fixture 350 in tank 10b.

Figure 10A:
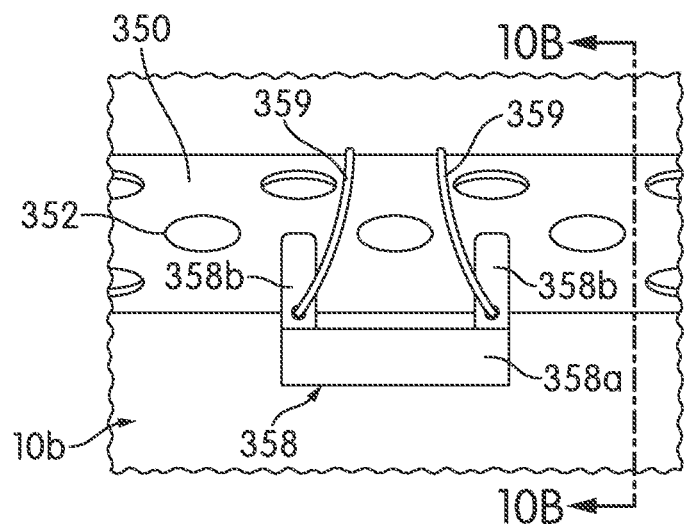
FIGS. 10A and 10B are front and side views, respectively, of a support bracket in a mixing system, according to some embodiments.
Figure 10B:
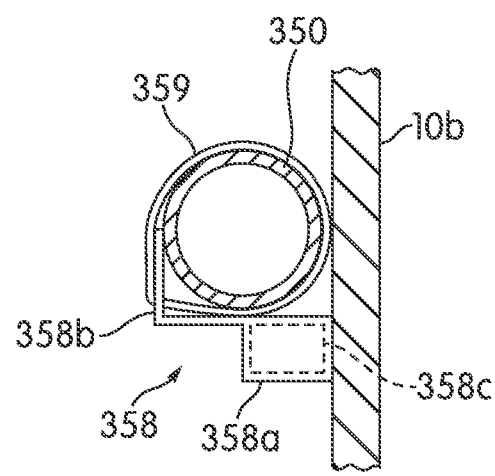

An enlarged view of a magnetically-affixable support bracket 358 is shown in FIGS. 10A and 10B. FIG. 10A is a front view of a bracket 358. FIG. 10B is a cross-section taken from the location indicated in FIG. 10A and showing a side of a bracket 358. Bracket 358 includes a base 358a encasing a magnet 358c that magnetically affixes bracket 358 to a steel wall of a water storage tank. Bracket 358 also includes front arms 358b at opposite axial ends of the bracket 358. Tie fasteners 359 are attached to the arms 358b and wrap around the discharge fixture 350, supporting the discharge fixture 350 on the bracket 358.

FIG. 5 is a cross-sectional view taken from the location indicated in FIG. 4 and that includes portions of water storage tank 10b and mixing system 300 omitted from FIG. 4. As shown in FIG. 5, the discharge fixture 350 may form a closed loop by extending around a perimeter of the inner walls of the water storage tank 10b. Such a configuration may effectively circulate water throughout the loop and circulate water along the periphery of the water storage tank 10b.

In some embodiments, a horizontal mixing system may have a configuration different from that shown in FIGS. 4 and 5. As but one example, a horizontally positioned discharge fixture may not extend around an entire periphery of a tank interior. For example, FIG. 6 is a cross-sectional view of a water storage tank 10b and a mixing system 600 that extends around a portion of the periphery of interior section 12c of tank 10c. End caps 655 may be provided at each end of the discharge fixture 650.

Many aspects of mixing system 600 shown in FIG. 4 are similar to mixing system 300 shown in FIGS. 4 and 5. For example, intake opening 610, check valve 625, intake conduit 620, pump system 630 positioned on catwalk 20c, discharge conduit 640, valve 642, discharge port 641 and tee 645 are substantially similar to intake opening 310, check valve 325, intake conduit 320, pump system 330 positioned on catwalk 20b, discharge conduit 340, valve 342, discharge port 341 and tee 345, respectively shown in the embodiment illustrated in FIG. 5. Discharge fixture 650 also includes a plurality of discharge holes 652 and is supported by a plurality of magnetically-affixable support brackets 658.

FIG. 8 illustrates circulation of water when the horizontal mixing system 300 shown in FIG. 4 is operating. Water enters intake opening 310 and passes through intake conduit 320 to pump system 330. Water then flows from pump system 330 and through discharge conduit 340 into discharge fixture 350, from which the water is ejected outward from discharge holes 352. In the configuration shown, water is ejected outward from discharge holes 352 and toward a middle region of the water storage tank 10b. The circulated water may eventually move downwards in the tank 10b and may then return to the intake opening 310 and through the mixing system 300 once more. Because the discharge holes 352 are configured to eject water horizontally, or horizontally and upwards, the mixing system 300 may effectively circulate water throughout the water storage tank 10b.

Figure 11:
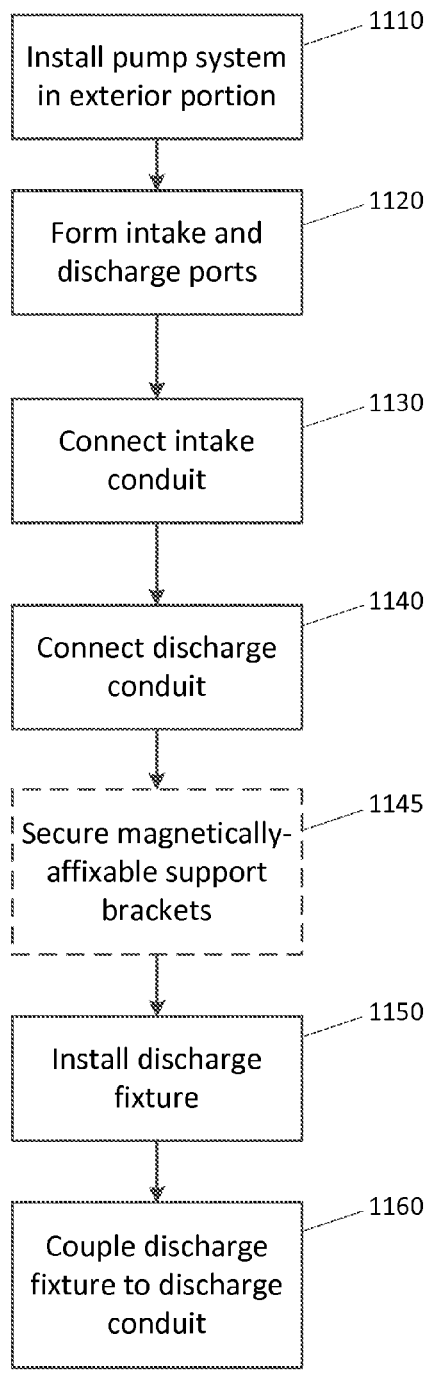
FIG. 11 is a flowchart illustrating a method of installing a mixing system for a water storage tank, according to some embodiments.

FIG. 11 is a flow chart showing steps in a method, according to some embodiments, for installing a mixing system in a water storage tank. Although processes having various method steps are described herein, other embodiments may include processes in which one or more method steps are omitted, added, performed in a different order relative to other steps, or combined with other steps. The method may begin at step 1110.

In particular, a pump system may be installed on an exterior portion of a water tank at step 1110. For example, and in connection with the installation of system 200 shown in FIGS. 2, 3 and 7, pump system 230 may be installed on the walking surface of the catwalk 20a. As another example, and in connection with the installation of system 300 shown in FIGS. 4, 5 and 8, pump system 330 may be installed on the walking surface of the catwalk 20b. Holes comprising an intake port and a discharge port may be drilled into, or otherwise formed in, a side wall of the water tank at step 1120. Continuing with the examples of systems 200 and 300, holes may be cut in portions of the wall of tank 10a (or tank 10b) and ports 221 and 241 (or ports 321 and 341) may be installed in those holes. In some examples, ports 221 and 241 (or ports 321 and 341) may be installed at or above a vertical level of catwalk 20a (or 20b) on the exterior section 13a (or 13b) of the water tank 10a (or 10b).

An intake conduit may be connected between the pump system and the intake port at step 1130. In the embodiment of system 200, intake conduit 220 may be connected to pump system 230 at intake section 231 and may pass through (or be connected to interior and exterior sides of) intake port 221. In the embodiment of system 300, intake conduit 320 may be connected to pump system 330 at intake section 331 and may pass through (or be connected to interior and exterior sides of) intake port 321. A discharge conduit may be connected between the pump system and the discharge port at step 1140. In the embodiment of system 200, discharge conduit 240 may be connected to pump system 230 at discharge section 232 and may pass through (or be connected to interior and exterior sides of) discharge port 241. In the embodiment of system 300, discharge conduit 340 may be connected to pump system 330 at discharge section 332 and may pass through (or be connected to interior and exterior sides of) discharge port 341.

A discharge fixture having a plurality of discharge holes may be installed in the water storage tank at step 1150. The discharge fixture may be placed above the intake opening in a vertical direction. For example, discharge fixture 250 of system 200 may be attached to structure 25 in the interior section 12a of tank 10a. As indicated above, this attachment may comprise affixing the discharge fixture to an interior component of the water tank such as a ladder extending along at least a portion of a vertical height of the water tank and/or beams supporting that ladder. As another example, discharge fixture 350 of system 300 may be attached to an interior side of a wall of tank 10b. As also indicated above, this may comprise securing the discharge fixture 350, horizontally along at least a portion of a perimeter of the water tank, to magnetically affixable brackets 358. In connection with installation of system 300 and other embodiments that utilize magnetically affixable brackets such as brackets 358, those brackets may have been placed during a preceding step 1145. The discharge fixture may be coupled to an end of the discharge conduit in an interior portion of the tank at 1160.

Where various portions of the mixing system described herein may be adhered together, e.g., with a glue or adhesive, a setting time period may be provided (for example several hours) to allow the adhesive to set before refilling water into the water storage tank and starting operation of the water mixing system.

Upon starting operation of the mixing system, the water storage tank may be filled with water, at least to or above the level of the intake opening to ensure that enough water may be directed to the pump system to properly operate the mixing system. Additionally, intake and discharge valves on the intake and discharge conduits may be opened and any air from the pump system may be removed to begin operation of the mixing system.

Mixing systems according to the present disclosure may be configured to operate continuously throughout the day, including in adverse weather conditions. Portions of the mixing system positioned exterior to the water storage tank, e.g., the pump system and conduits coupled thereto, may include a cover or other suitable structure to offer protection from harsh environmental conditions, such as high wind, direct sunlight, heat, or low temperature conditions. Additional components may also be included for filtration and/or for other purposes. For example, the mixing system may include various components for chemical injection into the water to ensure the water has proper potability and/or chemical balance. Additionally, control systems may be added to enable control of operations of the mixing system from the ground or a suitable remote location. For example, the mixing system may include various electronic components such that the mixing systems may be monitored remotely, e.g., by a smart phone or other portable electronic device. Monitoring systems may also be added to alert maintenance crews of any potential problems.

Maintenance may be performed on the mixing system by turning the power supply off to the pump motor and closing valves on the intake and discharge conduits. While the pump system may, in many examples, utilize electrical power from a conventional electrical grid source during operation of the mixing system, alternative energy sources, e.g., solar energy, may also be employed. For example, one or more solar panels and appropriate ancillary equipment (e.g., batteries, DC-to-AC power converters, etc.) may be included in the mixing system to power, e.g., the pump system during operation of the pump system.

Known mixing systems for water storage tanks result in a low amount of mixing such that only a small quantity of water is moved in the tank or, to the extent that known systems mix water throughout the tank, water is only circulated throughout the water storage tank over a relatively long time period. In contrast, water mixing systems as described herein may effectively circulate water throughout the tank in a shorter period of time than known systems.

Discharge fixtures for ejecting water throughout the tank, as described herein, may be designed to fit in many variations of water storage tank designs and sizes. For example, in water storage tanks having curved walls, water ejected from the mixing system may be returned down both sides of the tank in a direct flow, causing an induced flow to follow due to the high water velocity and resulting in more water circulation. Further, the water inside the tank may be ejected along the walls of the tank, and then converge at an opposite side, forcing the flow of water to go both up and down.

Accordingly, the mixing system herein may accomplish more complete circulation of the water and may be capable of moving a larger volume of water throughout the water storage tank in a given period of time. In particular, the mixing system may substantially circulate all or most of the water in the water storage tank over in a shorter amount of time than known mixing systems. For example, a mixing system according to the present disclosure may circulate all or most of the water in a large tank (e.g., 750,000 gallons or more) in a 48 hour period, as opposed to other known systems which may require more than twice as long. The mixing systems according to the present disclosure in smaller tank may circulate all or most of the water 4-6 times a day, or even as high as 8 times a day.

Accordingly, mixing systems of the present disclosure may be easy to install, adaptable for various water storage tank sizes and shapes, and may employ reliable systems with low likelihood of shutdowns or other operational issues. The mixing systems may also provide an effective and reliable recirculation system for water storage tanks.

The present invention has been described in terms of several exemplary embodiments thereof. Numerous other embodiments, modifications, and variations within the scope and spirit of the appended claims will occur to persons of ordinary skill in the art from the review of this disclosure.

I claim:

1. A system comprising:
a water storage tank configured to at least temporarily store an amount of water in an enclosed interior section, the water storage tank including:
a ladder comprising a pair of longitudinally extending side rails and a plurality of rungs between the pair of longitudinally extending side rails, the ladder being sized and dimensioned for a user to climb up or down thereon; and
a ladder support structure mounted to an interior surface of the water storage tank and supporting the ladder thereon; and
a mixing system including:
an intake conduit having at least a portion positioned in the interior section to withdraw water from a lower portion of the water storage tank;
a pump system having an intake section and a discharge section, the intake section coupled to the intake conduit;
a discharge conduit coupled to the discharge section of the pump system; and
a discharge fixture positioned in the interior section and having a plurality of portions branching from a connection to the discharge conduit, each of the portions including a plurality of discharge holes configured to spray water from the discharge conduit into the water storage tank so as to mix at least a portion of water inside the water storage tank,
wherein the plurality of discharge holes extend along a length of the discharge fixture, and wherein the discharge fixture is attached to the ladder or the ladder support structure at a plurality of locations between the plurality of discharge holes.

2. The system of claim 1, wherein the discharge fixture comprises one or more pipe segments vertically extending along at least a portion of an interior height of the water storage tank, and wherein the plurality of discharge holes are positioned on the one or more pipe segments.

3. The system of claim 2, further comprising a top end cap including a plurality of end cap discharge holes configured to discharge spray upwards in the water storage tank.

4. The system of claim 2, wherein the discharge conduit further comprises a tee and the discharge fixture extends upward from the tee and downward from the tee.

5. The system of claim 1, wherein the pump system includes a pump motor located exterior to the water storage tank and wherein a portion of the intake conduit and a portion of the discharge conduit extend outside the water storage tank via ports located on the water storage tank.

6. The system of claim 1, wherein the water storage tank comprises a catwalk on an exterior section of the water storage tank and wherein the pump system includes a pump motor positioned on the catwalk.

7. A method for installing a mixing system for a water tank comprising:
  installing a pump system on a catwalk on an exterior portion of an existing water tank, wherein the water tank is elevated on a tower, and wherein installing the pump system includes attaching an external component of the pump system to the catwalk;
  forming a hole comprising an intake port and a hole comprising a discharge port in a side wall of the water tank;
  connecting an intake conduit to an intake section of the pump system, wherein the intake conduit includes or passes through the intake port;
  connecting a discharge conduit to a discharge section of the pump system, wherein the discharge conduit includes or passes through the discharge port;
  coupling a discharge fixture to the discharge conduit in an interior portion of the water tank above the intake conduit, the discharge conduit having a plurality of portions branching from a connection to the discharge conduit, each of the portions having a plurality of discharge holes such that, when the water tank is at least partially filled with water and when the pump system is operating, the plurality of discharge holes eject water into the water tank so as to mix at least a portion of the water in the water tank; and
  attaching the discharge fixture to an interior component of the water tank, wherein the discharge fixture is attached to the interior component of the water tank at a plurality of positions along a length of the discharge fixture and between the plurality of discharge holes,
  wherein attaching the discharge fixture to an interior component of the water tank includes:
    affixing magnetically-affixable support brackets to an interior side wall of the water tank; and
    securing portions of the discharge fixture to the magnetically-affixable support brackets.

8. The method of claim 7, wherein the hole comprising the intake port and the hole comprising the discharge port are formed in the side wall of the water tank at or above a vertical level of a catwalk on the exterior portion of the water tank.

9. The method of claim 7, further comprising securing the discharge fixture to the interior component of the water tank extending along at least a portion of a vertical height of the water tank.

10. The method of claim 9, wherein the interior component is a ladder support structure.

11. The method of claim 7, wherein attaching the discharge fixture to an interior component of the water tank includes securing the discharge fixture horizontally along at least a portion of an inner periphery of the water tank.

12. The method of claim 7, wherein installing the pump system includes attaching a pump motor on a catwalk of the water tank.

13. A system comprising:
  a water storage tank elevated on a tower and configured to at least temporarily store an amount of water in an enclosed interior section, wherein the water storage tank includes an intake port and a discharge port, each of the intake port and the discharge port comprising a hole formed in a side wall of the water storage tank;
  a mixing system including:
    an intake conduit configured to withdraw water from a lower portion of the water storage tank;
    a pump system having a pump section, an intake section and a discharge section, wherein the pump section is installed on a catwalk on an exterior portion of the water storage tank, wherein the intake section passes through the intake port and is coupled to the intake conduit, and wherein the discharge section passes through the discharge port;
    a discharge fixture coupled to the discharge section of the pump system and extending continuously in a horizontal direction along at least a majority of an inner periphery of the water storage tank, the discharge fixture including a plurality of discharges holes configured to spray water from the discharge fixture into the water storage tank in a radially inward direction and an upward direction so as to mix at least a portion of water inside the water storage tank; and
    a plurality of magnetically-affixable support brackets attaching the discharge fixture to an interior wall of the water storage tank at a plurality of positions along a length of the discharge fixture and between the plurality of discharge holes,
    wherein each of the plurality of magnetically-affixable support brackets is affixed to a portion of the interior wall of the water storage tank and secures a portion of the discharge fixture thereon so as to attach the portion of the discharge fixture to the interior wall of the water storage tank.

14. The system of claim 13, wherein the plurality of discharge holes are positioned on upper and side portions of the discharge fixture to spray water in the radially inward direction and the upward direction in the water storage tank.

15. The system of claim 13, wherein the discharge fixture extends fully around the inner periphery of the water storage tank.

* * * * *